Dec. 1, 1959   I. G. REILLY   2,915,356
INDICATING RECORDER AND CASING
Filed Jan. 5, 1955   2 Sheets-Sheet 2

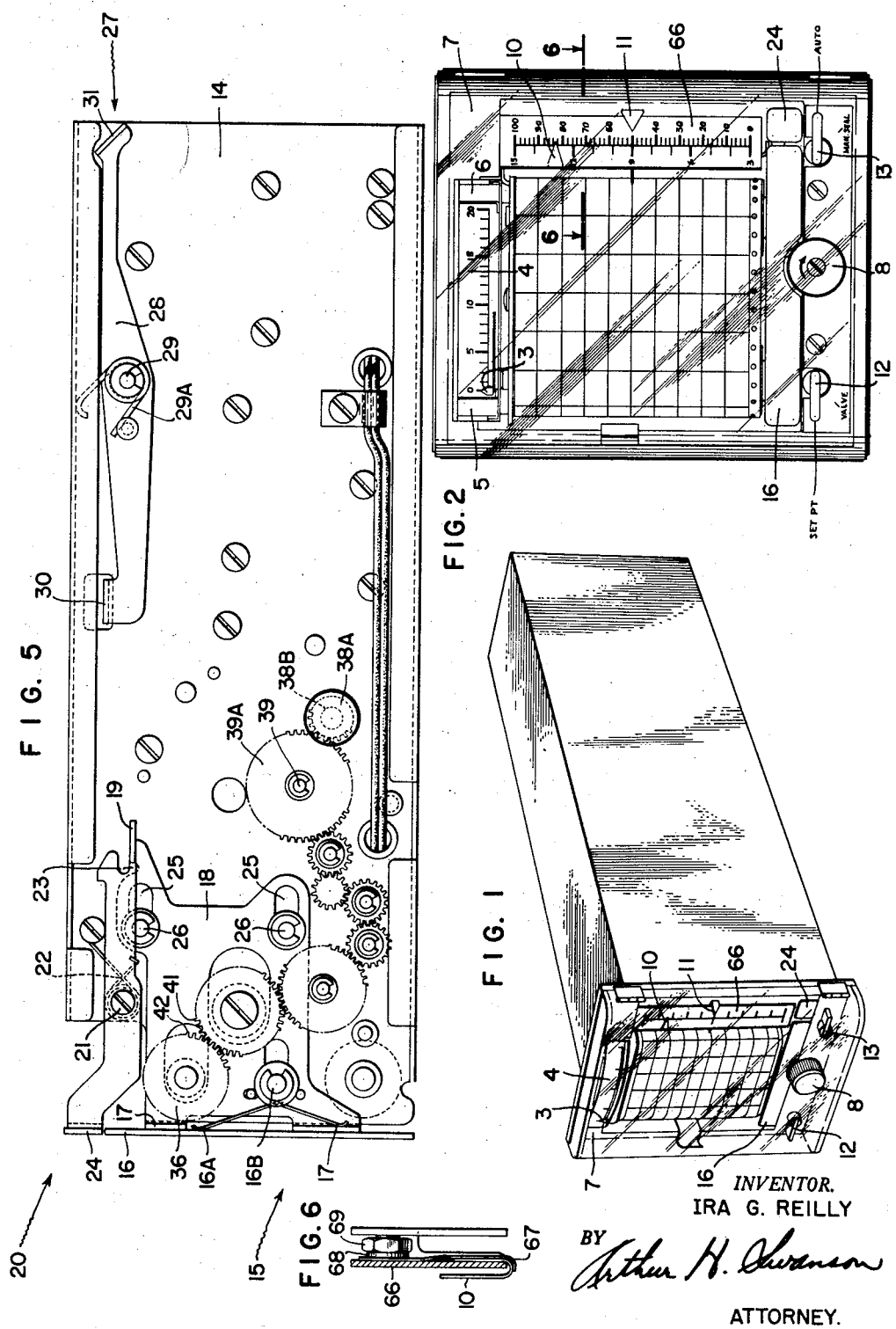
Dec. 1, 1959  I. G. REILLY  2,915,356
INDICATING RECORDER AND CASING
Filed Jan. 5, 1955  2 Sheets-Sheet 1
INVENTOR.
IRA G. REILLY
BY Arthur H. Swanson
ATTORNEY.

INVENTOR.
IRA G. REILLY
BY
ATTORNEY.

United States Patent Office
2,915,356
Patented Dec. 1, 1959

2,915,356

INDICATING RECORDER AND CASING

Ira G. Reilly, Hatboro, Pa., assignor to Minneapolis-Honeywell Regulator Company, Minneapolis, Minn., a corporation of Delaware Application January 5, 1955, Serial No. 479,989

1 Claim. (Cl. 346—17)

Among the objects of this invention are to provide an instrument for accurately indicating, recording, and/or controlling process variables, which instrument operates more simply and is more easily installed and adjusted than those heretofore known.

The various features of novelty which characterize this invention are pointed out with particularity in the claims annexed to and forming a part of this specification. For a better understanding of the invention, however, its advantages and specific objects obtained with its use, reference should be had to the accompanying drawings and descriptive matter in which is illustrated and described a preferred embodiment of the invention.

In the drawings:

Fig. 1 is a perspective view of the recorder;

Fig. 2 is a front view of the case with the transparent door closed;

Fig. 5 is a bottom or inverted view of the chassis; and

Fig. 6 is a horizontal cross section on line 6—6 of Fig. 2 viewed in the direction of the arrows.

Figure 3:
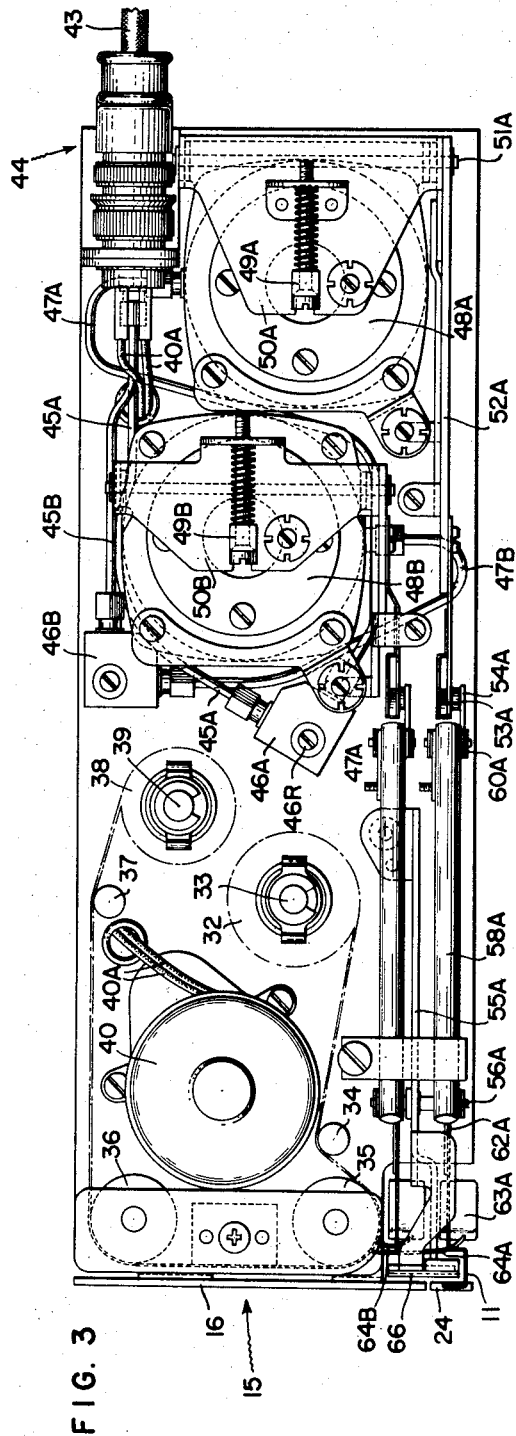
Fig. 3 is a top or plan view of the chassis.

The instrument of this invention is useful in air-operated circuits such as those shown in U.S. Patent 2,666,585, issued January 19, 1954, to Louis Gess. Such circuits provide means for indicating, recording, and/or controlling an industrial process from a remote location referred to as the control room. Such circuits include: (1) a final control element, such as a valve, controlling an agent which affects one variable of the process under control; (2) a measuring element responsive to the measured or process variable under control; (3) a controller connected to the measuring element so that the measuring element actuates the final control element automatically in response to variations in the measured or process variable; (4) a manually operated air-pressure-regulator connected to the final control element and operable to actuate it manually; and (5) a transfer switch adapted to connect the final control element to the controller for automatic actuation or to the regulator for manual actuation.

The instrument of this invention is designed to be mounted in the control room on a vertical panel. Signals are fed to the recorder, so as to actuate the pens and pointers thereof, in the form of variable air pressures from the final control element, or from the set point mechanism or from the output of the controller, or from the regulator. The instrument includes knobs which form handles for actuating mechanically the regulator or the transfer switch or for selecting the air pressure to be applied to the receivers in the recorder.

Case

Referring to Figs. 1 and 2, the instrument is mounted on a control panel or the like (not shown) by means of a case comprising a rectangular, elongated box in which the elements of the instrument are mounted. This case has a closed back and an open front. A strong door of transparent, plastic material is fastened to case 1 with stainless steel hinges. This door has, at its rim, a dust ledge interfitting with the front of the case to give maximum protection against dirt to the parts lodged within the case. At the same time, this transparent door affords a clear view of the chart and scale which are visible from the front of the case. All the adjusting knobs (hereinafter mentioned) are completely enclosed when the door is shut.

There is mounted on the front of the case a pressure gauge, comprising a horizontally movable pointer 3 cooperating with a horizontal scale 4. This gauge may be connected to indicate the pressure of the air applied to the final control valve. Adjacent the ends of scale 4 are tabs 5 and 6 which may be marked "Open" and "Close," respectively, although they are not so marked in the drawing. Tabs 5 and 6 are removable and interchangeable and may be snapped on either end of the scale 4 so as to adapt the gauge to read directly acting valve pressures or reversely acting valve pressures. The case 1 need be provided in only one color. A removable bezel 7 is attached to the case. This bezel can be provided in a plurality of different colors to match the color scheme of the panel.

At the lower center of the front of the case is a pressure regulator knob 8 which provides a handle for adjusting the output of an air-pressure-regulator of known construction and not disclosed in detail herein. Knob 8 is used to adjust the set point pressure supplied to a controller which is used in conjunction with the recorder, when the final control element is being automatically controlled. Knob 8 also is used to control the air pressure supplied to the final control element, when on manual control.

Two pointers 10 and 11 operate over vertical, indicating scale 66. The first or left-hand pointer 10 is manually adjustable vertically to indicate the set point. Fig. 6 shows that pointer 10 is of generally U-shape as viewed from the bottom. The rear arm of pointer 10, which is on the right hand in Fig. 6, is yieldingly engaged by a strip 67 of flexible or springy metal which extends from top to bottom of scale 66 along the left-hand edge thereof (as seen in Figs. 1 and 2). Strip 67 is held to scale 66 by washer 68 and nut 69.

The second or right-hand pointer 11 indicates either: (1) the value of the set point pressure applied to the controller or the output pressure of the controller, when the process is on automatic control; or (2) the pressure applied to the final control valve, when on manual control.

A spring-loaded knob 12 at the lower left operates a pneumatic switch and, when held in the opposite position to that in which it is shown (i.e., the position marked with the legend "Valve"), causes the right hand pointer 11 to indicate the air pressure applied to the final control valve. When the knob 12 is in its normal position, which is the position in which it is shown (marked with the legend "Set PT") the switch controlled by the knob 12 causes the right hand pointer 11 to indicate the output pressure of the regulator controlled by the knob 8. This is the set point pressure applied to the controller on automatic control and the manually regulable pressure applied to the final control valve on manual control.

At the lower right is knob 13 which operates a second pneumatic switch. The legend "Auto" indicates automatic control of the process, while the legend "Man." indicates manual control. The legend "Seal" indicates a position used when switching from manual to automatic control or vice versa. The use of this "Seal" position accomplishes two things: first, it locks the existing controlled air pressure in the final control valve; second, it locks the controller output air pressure out of the control system. With the knob 13 in the seal position, the final control valve will remain locked in the position which it presently occupies regardless of any changes in the regulator output or the controller air pressure.

Chassis

Figure 4:
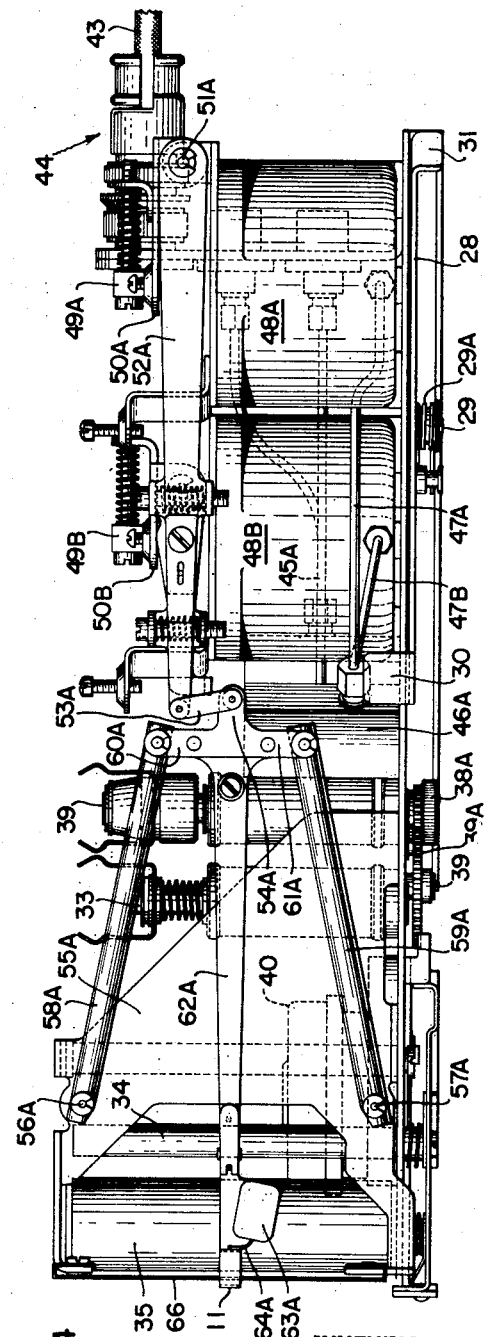
Fig. 4 is a side elevation of the chassis.

Figs. 3, 4, and 5 disclose the chassis and the parts carried thereby. This chassis comprises a flat plate or shelf 14 on which the elements of the instrument are mounted. The chassis 14 and the parts carried thereby may be slid into or out of the case 1 after opening the door 2. Fig. 5 shows that to aid in the removal of the chassis a strong T-shaped handle, generally indicated at 15, is provided at the front of the chassis. This handle comprises a flat, vertical plate 16 connected by ears 17 to a horizontal plate 18 having at its rear a vertical ear 19. A first spring bears at its front ends 16A against plate 16 and is carried intermediate its ends by stud 16B on shelf 14.

A first catch, generally indicated at 20, is pivotally attached to shelf 14 by screw 21 and is biased by second spring 22 so that its rear end 23 normally engages one face of ear 19. A flat, vertical thumb piece 24 is provided at the front of catch 20. When the thumb piece 24 is pressed, the catch 20 turns clockwise, as seen in Fig. 5, and moves vertical end 23 out of engagement with ear 19. This permits the free ends 16A of the first spring to slide the handle 15 forward to the extent permitted by the slots 25 in the horizontal plate 18. The rear portions of the slots 25 then engage the pins 26 fast on shelf 14 so that the shelf 14 and all the parts carried thereby can be drawn forward by means of the handle 15. First catch 20, in its normal position in which it is shown in Fig. 5, locks the chassis 14 to the case 1 and thus holds the chassis securely within the case. When first catch 20 is turned clockwise, as seen in Fig. 5, this engagement between the chassis and case is broken.

A second catch, generally indicated at 27, permits the chassis to be withdrawn from the case only partially. This partial withdrawal permits all necessary adjustments to be accessible. This second catch 27 comprises a generally horizontal lever 28 pivoted at 29 and having, at its forward or left-hand end, a vertical thumb piece 30. When thumb piece 30 is engaged by the hand of the operator, the catch 27 may be rotated clockwise, as seen in Fig. 5, against the bias of third spring 29A, so as to free the vertical ear 31 on the rear thereof from engagement with the part of the case 1 (not shown in Fig. 5) and thus permit the chassis and the parts carried thereby to be completely removed from the case.

Chart drive structure

This instrument includes a recorder which has a strip chart made up of a long, flat sheet of paper which may be rolled up. A supply roll 32 of this chart is mounted on a spindle 33. The chart is trained around pins 34 and 35 so as to extend across the front of the case. From roll 35 the chart passes over another roll 36 and a pin 37 to a take-up roll 38 mounted on a spindle 39.

The chart is adapted to be drawn off supply roll 32 and wound up on take-up roll 38 by means of a chart drive motor, indicated as an electric motor 40. Wires 40A conduct electricity to chart drive motor 40. If desired, an air-pressure-operated motor may be employed to drive the chart. Such an air-pressure-operated motor is shown in application Serial Number 407,793; filed February 24, 1954; in the name of Robert Clark DuBois, now Patent No. 2,718,878. As is best seen in Fig. 5, the output of motor 40 is a drive gear 41 which meshes with a gear 42 (driving roll 35) and with a gear train, generally indicated at 37, terminating in a final gear 39A fastened to and turning spindle 39 of take-up roll 38. A knurled knob 38A is attached to and rotates a gear 38B which meshes with gear 39A. Knob 38A provides means for moving the chart manually.

Servomotors or receivers and pen structures

The recorder is adapted to mark on the chart records of the values of measured or process variables. These process variables are measured, at a point remote from the recorder, by measuring apparatus which converts the variations in the measured variable to variations in air pressure. This variable air pressure is transmitted by pipes, which are connected to the recorder by screw-type, quick-connect pneumatic connectors, which permit quick removal of the chassis. The electric wires 40A for the chart drive motor 40 are grouped together and enter the recorder by means of a conduit 43 engaging with the connector 44.

The recorder shown is a two pen recorder but the servomotor or receiver structures and pen structures (to be described hereinafter) are substantial duplicates so that but one of the servomotors or receivers and but one of the pen structures will be described.

This servomotor or receiver comprises a pipe 45A which leads to a header 46A having in it a manually variable restriction formed by a needle valve 46R. Such a restriction damps out any unwanted, high frequency fluctuations of the incoming signal. A second pipe 47A connects to a rigid, stationary casing 48A in which is mounted a flexible member such as a bellows (not shown) biased in opposition to the air pressure within the casing by a spring (not shown). Such a receiver is one type of air-operated motor which may be employed to actuate the indicating pointers or recorder pens. If desired, electric motors can be used for this purpose. To a movable part of this flexible member is fixed a vertical, rigid member having pivotal engagement at its upper end with a block 49A secured to a flat plate 50A pivoted at 51A. A first lever 52A is secured to plate 50A and is adapted to rotate with it about pivot 51A. First lever 52A is connected at its left-hand or free end by means of a link 53A to arm 54A of a four-armed lever. A stationary, vertical plate 55A is mounted on shelf 14 and has two pivots 56A and 57A connected thereto. Second levers or tubes 58A and 59A are connected at their left-hand ends to pivots 56A and 57A, respectively. At their right-hand ends second levers or tubes 58A and 59A are pivotally connected to arms 60A and 61A of the four-armed lever. The fourth arm 62A of the four-armed lever is much longer than the others and carries at its free or left-hand end an ink reservoir 63A from which projects an elongated capillary tube 64A, comprising a pen which engages at its tip with the strip chart so as to press the strip chart against roll 35. Lever arm 62A also carries on its free or left-hand end pointer 11 which cooperates with vertical scale 66.

The second receiver and pen structure is substantially a duplicate of the first and comprises the same elements to which the same reference characters have been applied, distinguished by a B in place of an A. Since four-armed lever and the pen structure elements 54B to 64B, inclusive, are directly behind the same elements of the first pen structure they cannot be seen in Fig. 4.

Operation of recorder

Pointer 10 is moved manually over scale 66 to a point which indicates that value of the signal to be applied to the servomotor which is to serve as the datum or value of the process variable from which deviation is to be measured.

A variable air pressure is applied through pipe 45A, header 46A, and restriction 46R, and pipe 47A to the space enclosed between rigid casing 48A and the flexible member, which forms a movable wall thereof. This pressure compresses the spring, which biases the flexible member, to a greater or less extent. Variations in this air pressure cause block 49A to move vertically and rock plate 50A and first lever 52A about pivot 51A. Movement of the free end of lever 52A causes link 53A to move the four-armed lever so that the pointer 11, on the free end of arm 62A, moves vertically in a straight line over scale 66 and pen 64A moves vertically in a straight line over the chart. When the knob 12 is in the position in which it is shown in Figs. 1 and 2, the signal or air pressure applied to servomotor 48A is the set point pressure applied to the controller. This set point pressure is varied by turning knob 8 until pointer 11 is aligned with pointer 10 thus indicating that the set point pressure applied to the controller has the value desired.

While, in accordance with the provisions of the statutes, I have illustrated and described the best form of the invention now known to me, it will be apparent to those skilled in the art that changes may be made in the form of the apparatus disclosed without departing from the spirit of the invention as set forth in the appended claims, and that in some cases certain features of the invention may sometimes be used to advantage without a corresponding use of other features.

Having now described my invention, what I claim as new and desire to secure by Letters Patent is as follows:

In an instrument for indicating, recording, or controlling an industrial process, including, a case comprising a rectangular box having a closed back and an open front, a transparent door hinged to and interfitting with an adapted to close the front of the case, a chassis slidably mounted in said case so as to fit therein or to be withdrawn therefrom, a handle mounted on said chassis and having limited sliding movement relative thereto, a first spring biasing said handle toward that limit of its sliding movement in which said handle extends from said chassis, a first latch having one position in which said first latch restrains said handle against the bias of said spring, said first latch being manually movable into and out of said one position, a second spring biasing said first latch for limited movement in one direction, a second latch having one position in which said second latch locks said case and said chassis together with said chassis partially extending from said case, a third spring biasing said second latch so that said second latch automatically enters said one position during the sliding movement of said chassis relative to said case and locks said case and said chassis together, said third spring being manually movable to release said second latch from said one position, a servomotor mounted on said chassis and movable in response to a signal applied thereto, a linkage actuated by said servomotor, a scale mounted on said chassis, a pointer mounted on and moved by said linkage along said scale to indicate on said scale the value of the signal applied to said servomotor, means for supporting a chart on said chassis, and a pen mounted on and moved by said linkage over said chart to record on said chart the value of the signal applied to said servomotor.

References Cited in the file of this patent

UNITED STATES PATENTS

| | | |
|---|---|---|
| 2,537,508 | Brokaw | Jan. 9, 1951 |
| 2,594,136 | Di Maggio | Apr. 22, 1952 |
| 2,663,609 | Jones | Dec. 22, 1953 |

FOREIGN PATENTS

| | | |
|---|---|---|
| 1,028,391 | France | Feb. 25, 1953 |